United States Patent
Cheetham et al.

(10) Patent No.: US 7,246,113 B2
(45) Date of Patent: Jul. 17, 2007

(54) SYSTEMS AND METHODS FOR SELECTING A MATERIAL THAT BEST MATCHES A DESIRED SET OF PROPERTIES

(75) Inventors: William Estel Cheetham, Clifton Park, NY (US); Sanjay Braj Mishra, Evansville, IN (US); Jaehong Suh, Clifton Park, NY (US); Vinod Amladi, Bangalore (IN); Dagumati Dayakara Reddy, Bangalore (IN); Srikant Vitta, Bangalore (IN)

(73) Assignee: General Electric Company, Schenectady, NY (US)

( * ) Notice: Subject to any disclaimer, the term of this patent is extended or adjusted under 35 U.S.C. 154(b) by 830 days.

(21) Appl. No.: 10/263,216

(22) Filed: Oct. 2, 2002

(65) Prior Publication Data

US 2004/0068339 A1  Apr. 8, 2004

(51) Int. Cl.
*G06F 17/30* (2006.01)
(52) U.S. Cl. ............... 707/3; 707/4; 707/5; 707/6
(58) Field of Classification Search ............... 707/3, 707/4, 5, 6
See application file for complete search history.

(56) References Cited

U.S. PATENT DOCUMENTS

| | | | |
|---|---|---|---|
| 5,555,406 A | | 9/1996 | Nozawa |
| 5,974,246 A | | 10/1999 | Nakazawa |
| 6,046,300 A | * | 4/2000 | Umetsu et al. ............ 528/176 |
| 6,449,612 B1 | * | 9/2002 | Bradley et al. ............ 707/6 |
| 6,546,388 B1 | * | 4/2003 | Edlund et al. ............ 707/5 |
| 6,718,324 B2 | * | 4/2004 | Edlund et al. ............ 707/5 |
| 7,054,860 B2 | * | 5/2006 | Inaba et al. ............ 707/5 |

OTHER PUBLICATIONS

European Search Report for EP 03256210; Date of Completion of the Search Apr. 12, 2006.
T. Warren Liao A Fuzzy Multicriteria Decision-Making Method For Material Selection; Journal of Manufacturing Systems; vol. 15/No. 1/ Jan. 1996.

* cited by examiner

*Primary Examiner*—Jeffery Gaffin
*Assistant Examiner*—Farhan M. Syed
(74) *Attorney, Agent, or Firm*—Cantor Colburn LLP

(57) ABSTRACT

Material selection systems and methods for quickly identifying which existing material best matches a desired set of properties are described so that product development time can be minimized. Users may input the properties they desire in a material, which properties they want searched and scored, the acceptable values of those properties, and a priority value for each property. Preliminary matching materials may be retrieved from a materials database, and an index value for each property value may be calculated. One of four fuzzy membership functions may then be utilized to calculate a scored property value for each property of each material. The scored property value may then be weighted to account for the priority value assigned to each property. The results may then be sorted in descending order based on their overall match scores, and output to the user so the best matching material(s) is readily identifiable by the user.

52 Claims, 4 Drawing Sheets

SYSTEMS AND METHODS FOR SELECTING A MATERIAL THAT BEST MATCHES A DESIRED SET OF PROPERTIES

FIELD OF THE INVENTION

The present invention relates generally to systems and methods for finding a material that matches a set of properties. More specifically, the present invention relates to material selection systems and methods for quickly finding a material that best matches a desired set of properties so that product development time can be shortened.

BACKGROUND OF THE INVENTION

Often times, when new products are being designed, a material having certain properties is desired, but it may not be readily apparent which material best meets those properties. Therefore, experimentation may be required to find such a material. Such experimentation may be a time consuming and expensive endeavor, thereby making experimentation undue and unfeasible in many instances.

Current systems and methods for finding materials that possess desired properties only result in unorganized lists of materials having properties that are somewhere in the vicinity of the desired properties. Someone then has to sort through this list of materials and decide which material(s) most closely matches the desired properties. Often times, this may be done in an engineer's head, or the decision may be based on instinct, knowledge and experience or other unscientific means. As such, further testing or experimentation is often required to find out which of the materials actually best matches the desired properties overall. This is further complicated by the fact that a material may very closely match one or more desired property values, while not very closely matching other desired property values at all. Therefore, it is often difficult to tell which material(s) in the list will best match the desired properties overall.

There is presently no quick and easy way to find a material that best matches the desired properties overall. Thus, there is a need for systems and methods that allow one to quickly identify which existing material(s) most closely matches the desired properties overall, thereby allowing product development cycle times to be significantly reduced. There is also a need for such systems and methods to be automated using a computer. There is yet a further need for such systems and methods to be accessible to users via the Internet. There is also a need for such systems and methods to take all the desired properties into account collectively when calculating which material(s) best matches the desired properties overall. There is still a further need for such systems and methods to utilize fuzzy membership functions to score existing materials according to how well they match each individual desired property value. There is also a need for such systems and methods to allow properties having higher priorities to be given greater weight than properties having lower priorities when the overall match of the material is being calculated. Finally, there is a need for such systems and methods to allow materials to be ranked in descending order according to their calculated overall match, so that the material(s) that best matches the desired properties is readily identifiable by a user.

SUMMARY OF THE INVENTION

Accordingly, the above-identified shortcomings of existing systems and methods are overcome by embodiments of the present invention. This invention relates to material selection systems and methods that allow one to quickly identify which existing material(s) most closely matches a desired set of properties overall, thereby allowing new product development cycle times to be significantly reduced. An embodiment of this invention comprises systems and methods that utilize a computer to automatically search a database of materials and calculate which material therein best matches the desired set of properties overall. In some embodiments, the systems and methods of this invention may be accessible to users via a personal computer, an intranet, an extranet, or the Internet. Embodiments of the systems and methods of this invention may take all the desired properties into account collectively when calculating which material(s) best matches the desired set of properties overall. In embodiments of this invention, the systems and methods may utilize fuzzy membership functions to score existing materials according to how well they match each individual desired property value. Furthermore, properties having higher priorities can be given greater weight than properties having lower priorities when the overall match score of the material is being calculated. Finally, embodiments of the systems and methods of this invention can allow materials to be ranked in descending order according to their calculated overall match score, so that the material(s) that best matches the desired properties is readily identifiable by a user.

When designing a new product, often times a material possessing certain properties may be desired. The systems and methods of the present invention allow a user to input or select the various properties and property values that they desire in a material. For example, users may be able to select the properties they desire in a material. Users may also be able to select acceptable values for these desired properties, such as a minimum acceptable value, a maximum acceptable value, an acceptable point value, or a range of acceptable values. In embodiments, users may be able to select a priority for each desired property, such as high, medium or low. In embodiments, users may also be able to select how many matching materials they wish to see listed.

Once these property variables are selected, a search for the closest matching material can begin. In one embodiment, the first step involves searching a database of materials to find out which materials possess the properties that are desired. Next, an index value may be calculated for each property value of each material. Thereafter, a score may be calculated for each property value. Then, an overall match score may be calculated for each material, indicating how well the material matches the desired properties. Finally, the materials may be sorted in descending order based on their overall match scores so that a user can easily identify which material matches all the desired properties the best.

In one embodiment, fuzzy membership functions are used to calculate a score for each property value. These fuzzy membership functions determine the degree of similarity between the desired property values and the actual property values of existing materials. There are four different fuzzy membership functions utilized by the present invention, depending on what acceptable values are selected by the user for each desired property. For example, if the user selects a maximum acceptable value for a property, one fuzzy membership function is utilized to calculate a score for that property value. If the user selects a minimum acceptable value for a property, a second fuzzy membership function is utilized to calculate the score for that property value. If the user selects a range of acceptable values for a property, a third fuzzy membership function is utilized to calculate the score for that property value. Finally, if the user selects an acceptable point value for a property, a fourth fuzzy membership function is utilized to calculate the score for that property value.

In embodiments, each score may also be weighted to account for the priority selected for that property. For example, if a high priority is selected for a property, that property may be assigned a higher value than one having a lower priority so that when the overall match score is calculated, these priorities are taken into account.

In embodiments, the overall match score may take all the property values into account collectively. The calculations described above may be performed automatically by a computer, or they may be performed manually. Furthermore, the systems and methods may be designed so that, once a user selects the desired properties and acceptable property values, a database of materials is automatically searched and the best matching material therein is located.

The present invention has all the advantages of existing material selection systems and methods, but it requires less experimentation and laboratory time, thereby reducing product development cycle times so that new products can get to market quicker.

One embodiment of the present invention comprises a method for selecting a material that most closely matches a desired set of properties. This method comprises obtaining at least one input parameter from a user; retrieving actual property values for at least one preliminary matching material from a global data repository; determining how well each preliminary matching material matches a desired set of property values; and outputting the results to the user. This determining step further comprises calculating an index value for each actual property value of each preliminary matching material; scoring each property value to create a scored property value; weighting each scored property value by taking a priority value for each property into account to create a weighted scored property value; and calculating an overall match score for each preliminary matching material. The method may also comprise sorting the preliminary matching materials by their respective overall match scores prior to outputting the results to the user.

Another embodiment of the present invention comprises a system for selecting a material that most closely matches a desired set of properties. This system comprises a means for obtaining at least one input parameter from a user; a means for retrieving actual property values for at least one preliminary matching material from a global data repository; a material selection algorithm operable for determining how well each preliminary matching material matches a desired set of property values; and a means for outputting the results to the user. This material selection algorithm is further operable for calculating an index value for each actual property value of each preliminary matching material; scoring each property value to create a scored property value; weighting each scored property value by taking a priority value for each property into account to create a weighted scored property value; and calculating an overall match score for each preliminary matching material. The material selection algorithm may also be operable for sorting the preliminary matching materials by their respective overall match scores prior to outputting the results to the user.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various drawings and graphical representations thereof, in which.

DETAILED DESCRIPTION OF THE INVENTION

Figure 1:
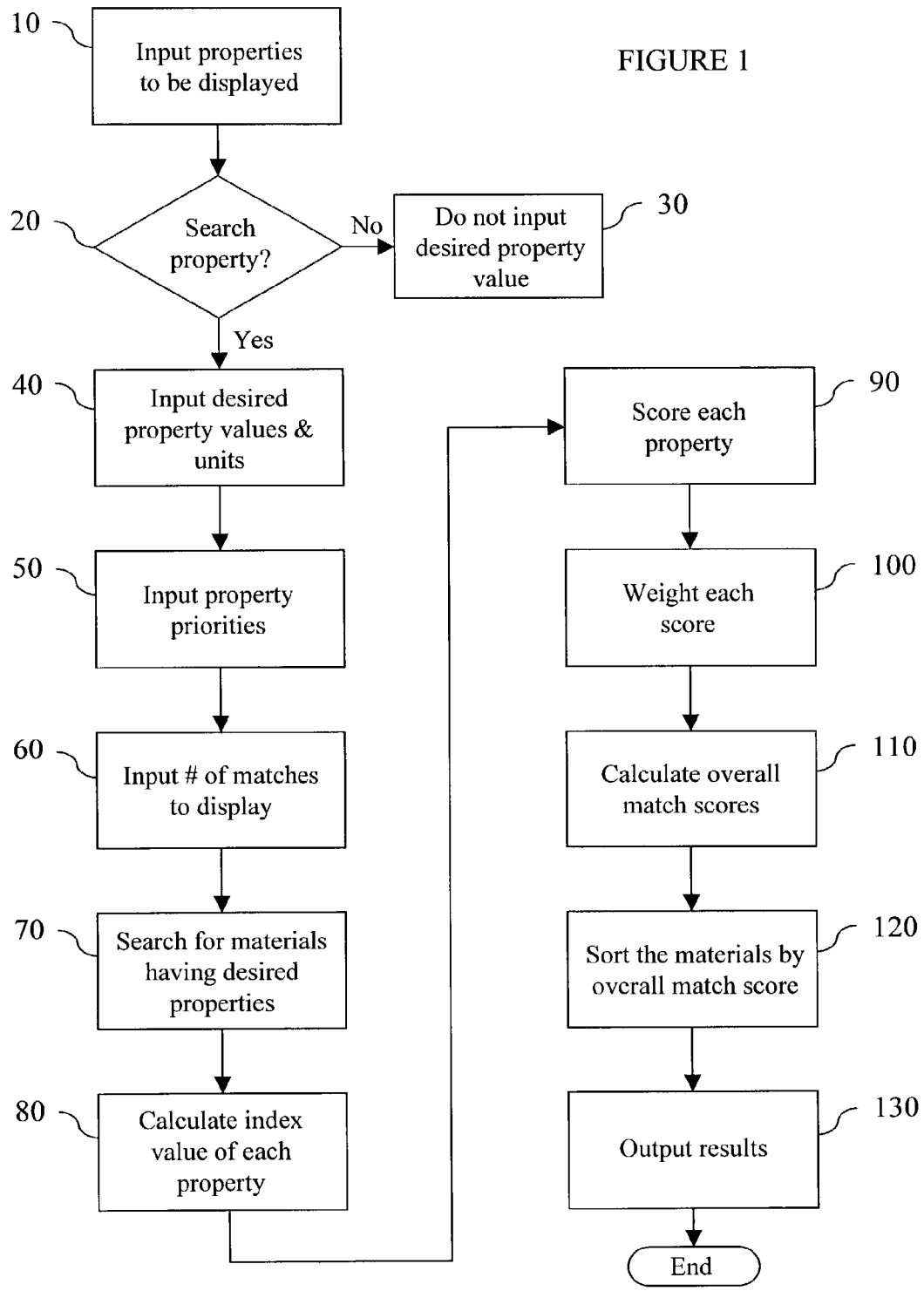
FIG. 1 is a flowchart showing the material properties retrieval and overall match score calculations that are performed in one embodiment of this invention.

For the purposes of promoting an understanding of the invention, reference will now be made to some preferred embodiments of the present invention as illustrated in FIGS. 1-6, and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Any modifications or variations in the depicted material selection systems and methods, and such further applications of the principles of the invention as illustrated herein, as would normally occur to one skilled in the art, are considered to be within the spirit of this invention.

The present invention comprises material selection systems and methods that allow one to quickly identify which existing materials most closely match a desired set of properties overall so that new product development time can be reduced. In one embodiment, the material selection method comprises the steps shown in FIG. 1. First, a user inputs the properties they wish to be displayed for each material 10. These properties may include mechanical properties, thermal properties, electrical properties or other desired properties. Such properties may include one or more of the following non-limiting properties: tensile strength, tensile strain at break, tensile modulus, flexural modulus, Izod impact notched at 23° C., HDT at 0.45 MPa, HDT at 1.80 MPa, Vicat softening temperature, coefficient of thermal expansion, relative thermal index (electrical), relative thermal index (mechanical with impact), relative thermal index (mechanical without impact), dissipation factor at 50 Hz, dissipation factor at 1 MHz, dielectric constant at 50 Hz, dielectric constant at 1 MHz, volume resistivity, surface resistivity, specific gravity, water absorption, and the UL94 rating at a given thickness. Once the user decides which properties they wish to have displayed, they then decide whether or not each property they selected is to be searched 20. If the user wants a particular property to be displayed, but not searched and scored, then they do not need to input a value for that property 30. If however, the user wants the property values to be searched, scored and displayed, then the user inputs the desired or acceptable values for that property 40, and also selects which units are desired for each property (i.e., SI units or British units). For example, the user may input a minimum acceptable value, a maximum acceptable value, a range of acceptable values, or an acceptable point value for each property being searched and scored. Next, the user may input the priority assigned to each property 50. The priorities may comprise high, medium and low. Next, the user may input the number of matching materials they wish to have displayed 60. For example, they may wish to see only the ten materials that most closely match the desired properties.

In embodiments of this invention, background calculations may be performed. Users may or may not even be aware that these background calculations are occurring. For example, if property values for a material are retrieved from the global data repository in SI units, but the user wants the units to be displayed in British or U.S. units, embodiments of the invention may convert the retrieved units to the appropriate desired units before displaying them to the user. Also, data may be normalized as needed so that testing methods used to measure a given property in one country can be normalized to test methods used to measure that same property in another country. Other background calculations may also be performed. For example, if results of a specific test method are requested by a user, but that test has not been performed and entered into the database, then if a similar test has been conducted, the desired results may in some cases be calculated from the actual results of the similar test.

Now, the search for the best matching material(s) can begin. First, a global data repository or database may be searched to make preliminary matching material selections 70. This global data repository may comprise data for materials from all around the globe, instead of just comprising data from one region of the globe. For example, embodiments of this invention comprise data for materials available in North America, Europe, Japan, Brazil, etc. all combined into one searchable global data repository. Contrary to many existing methods and systems for selecting a material that most closely matches a desired set of properties, this invention does not discard a material just because it does not match one or more property values very well. In fact, this invention allows materials to be preliminarily selected if they have property values that are just somewhat in the vicinity of the desired property values. Therefore, no null search results are returned to users with this invention—at least some materials will be retrieved and scored. Next, an index value can be calculated for each property value of each material 80. The manner in which the index value is calculated can vary depending on what the acceptable values are for the property. For example, in one embodiment, if a minimum acceptable property value or a maximum acceptable property value for a property is selected, the index value for that property may be calculated as follows:

$$\text{Index value} = \frac{\text{Actual property value}}{\text{Desired property value}}$$

If a range of acceptable property values is selected, the index value for that property may be calculated as follows:

$$\text{Index value}_{range} = \frac{\text{Actual property value} - (\text{LOW} + \text{HIGH})/2}{\text{HIGH} - \text{LOW}}$$

where LOW is the minimum value of the acceptable range specified by the user and HIGH is the maximum value of the acceptable range specified by the user. If an acceptable point value is selected, there is no need to calculate an index value for the property because the scoring algorithm for an acceptable point value does not take the index value into account.

Next, a score for each property value can be calculated 90. Generally, a property is given a score of about 0.7 if it satisfies the acceptable property value. A higher score is given if the material exceeds the acceptable property value, and a lower score is given if is does not meet the acceptable property value as well. A score of 0.0 is given if the material does not come close to matching the acceptable property value at all. Therefore, the highest scores are given to materials having property values that exceed the acceptable property values, or that are well within the specified ranges of acceptable property values. As such, and because a material is not eliminated from the search just because it does not match one property, it is possible to have a material that exceeds the desired property values for a few properties rank higher (i.e., be listed as a better overall match) than a material that just barely meets a greater number of desired property values.

Figure 2:
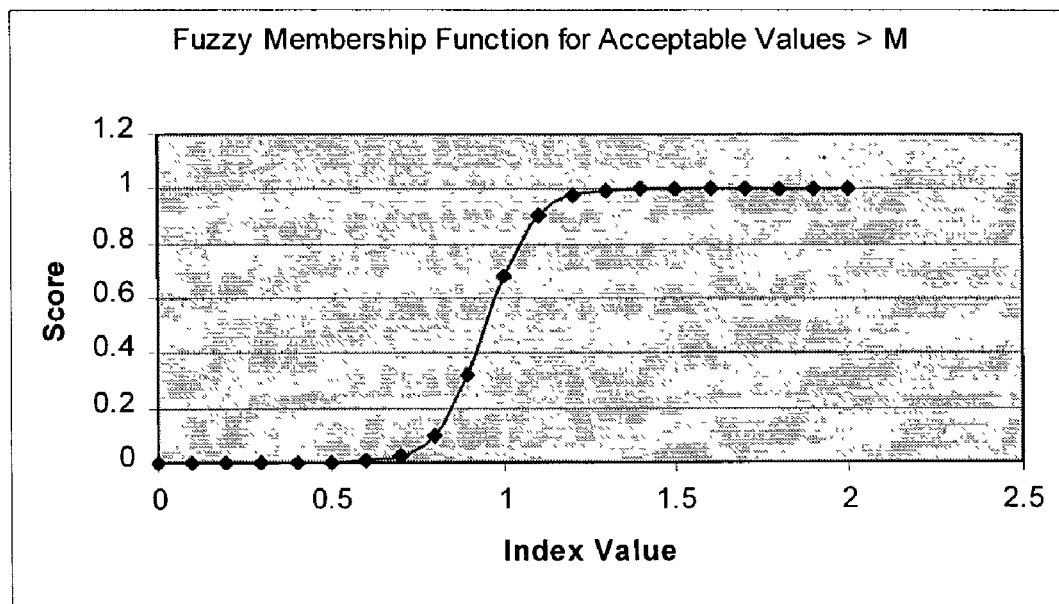
FIG. 2 is a graph showing the fuzzy membership function applied when a minimum acceptable property value is selected by a user.

In one embodiment, the score is calculated via one of four possible fuzzy membership functions. If a minimum acceptable property value is selected, the score for that property value may be calculated using a first fuzzy membership function:

$$\text{Score} = \frac{1}{1 + \exp[-\text{Slope}(\text{Index value} - \text{Crossover})]}$$

where Slope=15 and Crossover=0.95. A graphical representation of this sigmoidal fuzzy membership function is shown in FIG. 2.

Figure 3:
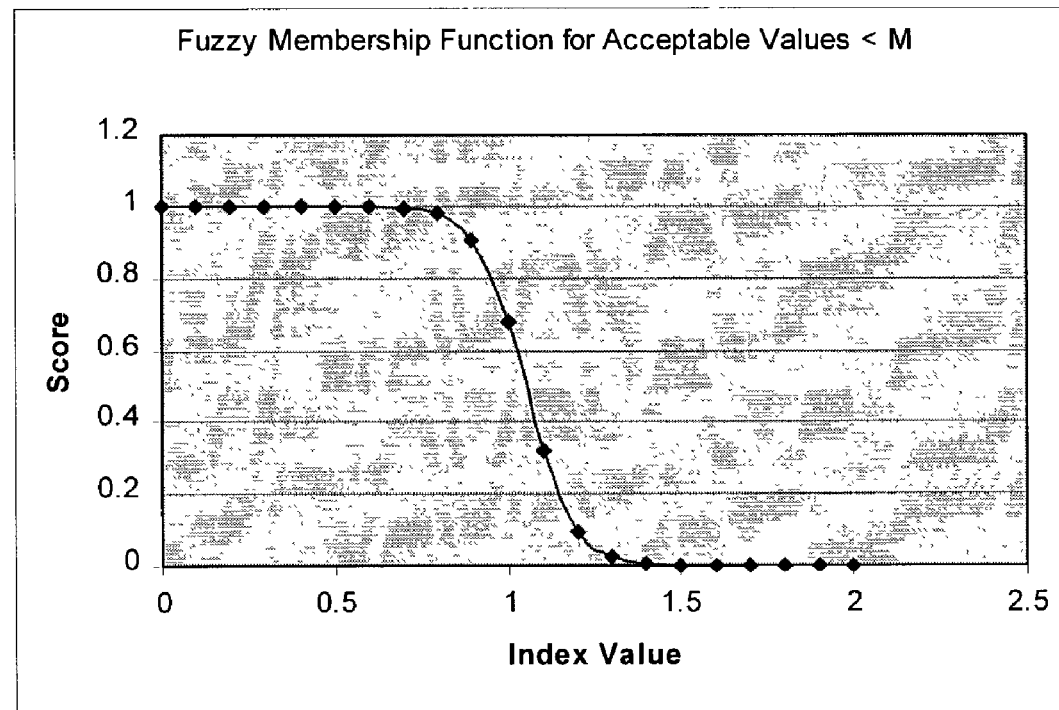
FIG. 3 is a graph showing the fuzzy membership function applied when a maximum acceptable property value is selected by a user.

If a maximum acceptable property value is selected, the score for that property value may be calculated using a second fuzzy membership function:

$$\text{Score} = \frac{1}{1 + \exp[-\text{Slope}(\text{Index value} - \text{Crossover})]}$$

where Slope=−15 and Crossover=1.05. A graphical representation of this sigmoidal fuzzy membership function is shown in FIG. 3.

If an acceptable point value for a property is selected, the score for that property value may be calculated using a third fuzzy membership function:

| If the Desired property value = 0 and: | Use This Fuzzy Membership Function: |
|---|---|
| Actual property value < 0 | Score = 0 |
| Actual property value = 0 | Score = 1 |
| Actual property value > 0 | Score = 0 |

Figure 4:
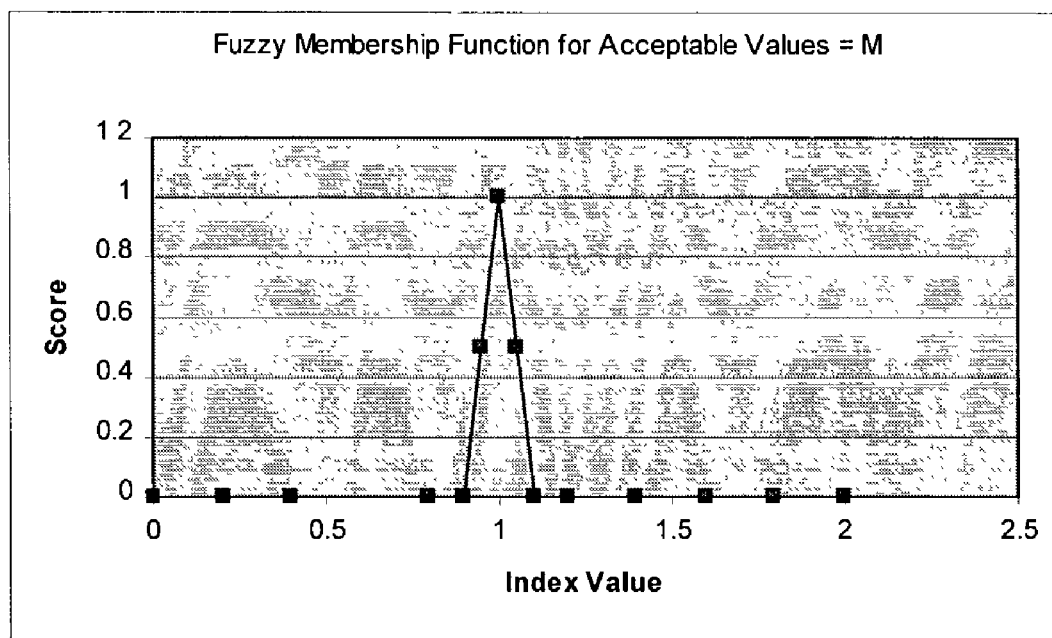
FIG. 4 is a graph showing the fuzzy membership function applied when an acceptable point value for a property value is selected by a user.

| If the Desired property value ≠ 0 and: | Use This Fuzzy Membership Function: |
|---|---|
| Actual property value < DPV * 0.9 | Score = 0 |
| DPV * 0.9 ≦ Actual property value < DPV | Score = $\frac{(DPV * 0.1) - DPV + APV}{(DPV * 0.1)}$ |
| Actual property value = DPV | Score = 1 |
| DPV < Actual property value ≦ DPV * 1.1 | Score = $\frac{(DPV * 0.1) + DPV - APV}{(DPV * 0.1)}$ |
| Actual property value > DPV * 1.1 | Score = 0 | where DPV=desired property value and APV=actual property value. A graphical representation of this fuzzy membership function is shown in FIG. 4.

Finally, if a range of acceptable property values is selected, the score for that property value may be calculated using a fourth fuzzy membership function which varies depending on where the index value falls as shown below.

| If Index Value Falls In This Range: | Use This Fuzzy Membership Function: |
|---|---|
| Index value < −1 | Score = 0 |
| −1 ≦ Index value < −0.5 | Score = 2(1.0 + Index value) |
| −0.5 ≦ Index value < 0.5 | Score = 1 |
| 0.5 ≦ Index value < 1 | Score = 2(1.0 − Index value) |
| 1 < Index value | Score = 0 |

Figure 5:
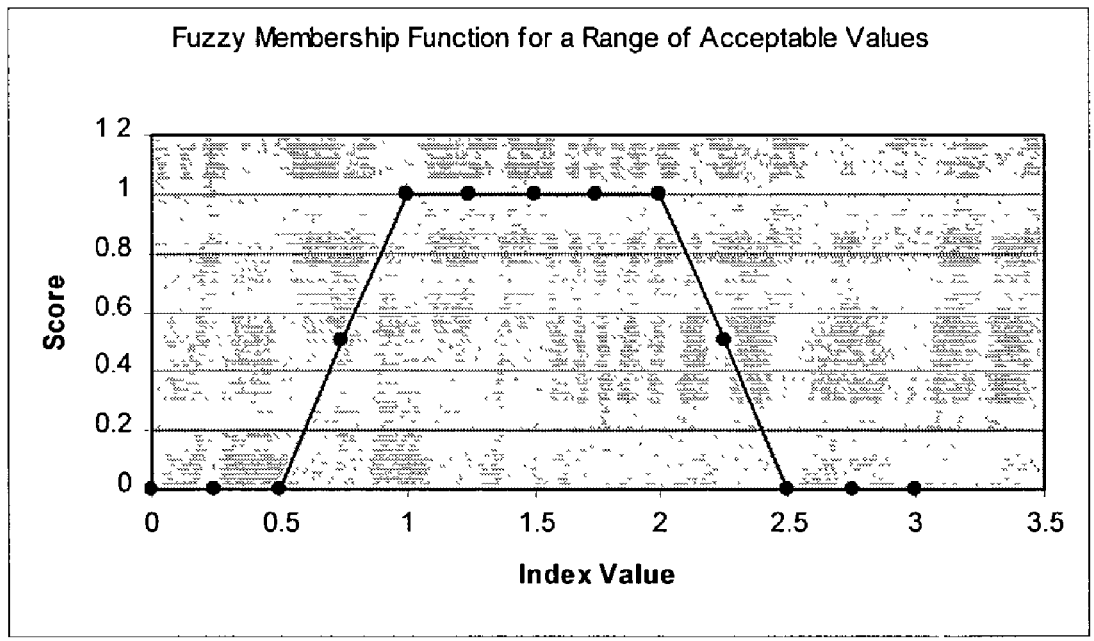
FIG. 5 is a graph showing the fuzzy membership function applied when a range of acceptable property values is selected by a user.

A graphical representation of this piecewise linear fuzzy membership function is shown in FIG. 5.

Once a score for each property value is calculated, each score can be weighted 100 according to the priority assigned to each property. For example, in this embodiment, if a property is given a high priority, a priority value of 4 is assigned to that property; if a property is given a medium priority, a priority value of 2 is assigned to that property; and if a property is given a low priority, a priority value of 1 is assigned to that property. The score can then be weighted by multiplying the score by the priority value.

Next, an overall match score can be calculated 110 as follows:

$$\text{Overall Match Score} = \frac{\text{Sum of the weighted scores}}{\text{Sum of all priorities}}$$

where the sum of all priorities is the sum of all priorities assigned to all properties. Thereafter, in this embodiment, the materials are sorted 120 in descending order of their overall match scores. Finally, a list of the best matching materials is output to the user 130 so the material that matches the best is listed at the top of the output list so it can be easily identified by the user.

To further clarify these calculations, reference will now be made to Table 1, which shows all the above-described calculations for a group of materials. For simplicity, the calculations for only one property of one material will described herein—flexural modulus for Material Grade Name 2735. First, the properties that were desired were selected—flexural modulus, RT Izod impact, tensile strength, and tensile strain at break. These properties are list in the first column in the table below.

| Grade Name | | 2735 | 5230R | 5230 | 2230EU | 2230 | X2300WX | 2230M | 2730U |
|---|---|---|---|---|---|---|---|---|---|
| Flex Mod (MPa) | Actual | 2136 | 2136 | 2136 | 2239 | 2239 | 2205 | 2239 | 2067 |
| | Score | 0.8162 | 0.8162 | 0.8162 | 0.7105 | 0.7105 | 0.8667 | 0.7105 | 0.4991 |
| | Priority | 4 | 4 | 4 | 4 | 4 | 4 | 4 | 4 |
| RT Izod Impact (kJ/m$^2$) | Actual | 75 | 64 | 64 | 80 | 80 | 64 | 64 | 64 |
| | Index | 1.1194 | 0.9552 | 0.9552 | 1.1940 | 1.1940 | 0.9552 | 0.9552 | 0.9552 |
| | Score | 0.9270 | 0.5196 | 0.5196 | 0.9749 | 0.9749 | 0.5196 | 0.5196 | 0.5196 |
| | Priority | 1 | 1 | 1 | 1 | 1 | 1 | 1 | 1 |
| Tensile Strength (MPa) | Actual | 54 | 54 | 54 | 55 | 55 | 59 | 55 | 55 |
| | Index | 0.9474 | 0.9474 | 0.9474 | 0.9649 | 0.9649 | 1.0351 | 0.9649 | 0.9649 |
| | Score | 0.8234 | 0.8234 | 0.8234 | 0.7818 | 0.7818 | 0.5557 | 0.7818 | 0.7818 |
| | Priority | 2 | 2 | 2 | 2 | 2 | 2 | 2 | 2 |
| Tensile Strain @ Break (%) | Actual | 110 | 110 | 110 | 120 | 120 | 120 | 100 | 120 |
| | Index | −0.5 | −0.5 | −0.5 | 1.5 | 1.5 | 1.5 | −2.5 | 1.5 |
| | Score | 1.00 | 1.00 | 1.00 | 0 | 0 | 0 | 0 | 0 |
| | Priority | 2 | 2 | 2 | 2 | 2 | 2 | 2 | 2 |
| Overall | Overall Match | 0.871 | 0.826 | 0.826 | 0.598 | 0.598 | 0.566 | 0.547 | 0.453 |
| | Best Match | 1 | 2 | 2 | 3 | 3 | 4 | 5 | 6 |

Next, the units desired for each of these properties, the desired values for each of these properties, the priorities of each of these properties, and the number of matching materials to be listed in the results were selected as follows:

| Properties Desired: | Priority Value |
| --- | --- |
| Flex. Mod. = 2176 MPa | High (4) |
| RT Izod Impact > 67 kJ/m$^2$ | Low (1) |
| Tensile Strength < 57 MPa | Medium (2) |
| Tensile Strain at Break (%) between 110 and 115 | Medium (2) |

For this embodiment, the six (6) best matching materials were asked to be listed in the results output, and the units selected were SI units. The actual value of flexural modulus for the 2735 material was 2136 MPa. As previously discussed, there is no need to calculate an index value for this property since the scoring algorithm for an acceptable point value does not take the index value into account. Therefore, the score for this property is calculated as follows:

$$\text{Score} = \frac{(DPV*0.1) - DPV + APV}{(DPV*0.1)}$$
$$= \frac{(2176*0.1) - 2176 + 2136}{(2176*0.1)} = 0.8162$$

Then, the score is weighted as follows:

Weighted score=Score*Priority
Value=0.8162*4=3.2648

The same calculations can be performed for each of the other properties and materials and then an overall match score can be calculated as follows:

$$\text{Overall Match Score} = \frac{\text{Sum of weighted scores}}{\text{Sum of all priorities}}$$
$$= \frac{3.2648 + 0.927 + 1.6468 + 2}{4 + 1 + 2 + 2} = .871$$

The overall match score rates how well a material fits the desired property values. Each material will have an overall match score ranging from 0 to 1.0, depending on how well it matches the desired properties. An overall match score of 1.0 means the material matches all the desired properties perfectly, while an overall match score of 0.0 means the material does not match the desired properties at all.

Figure 6:
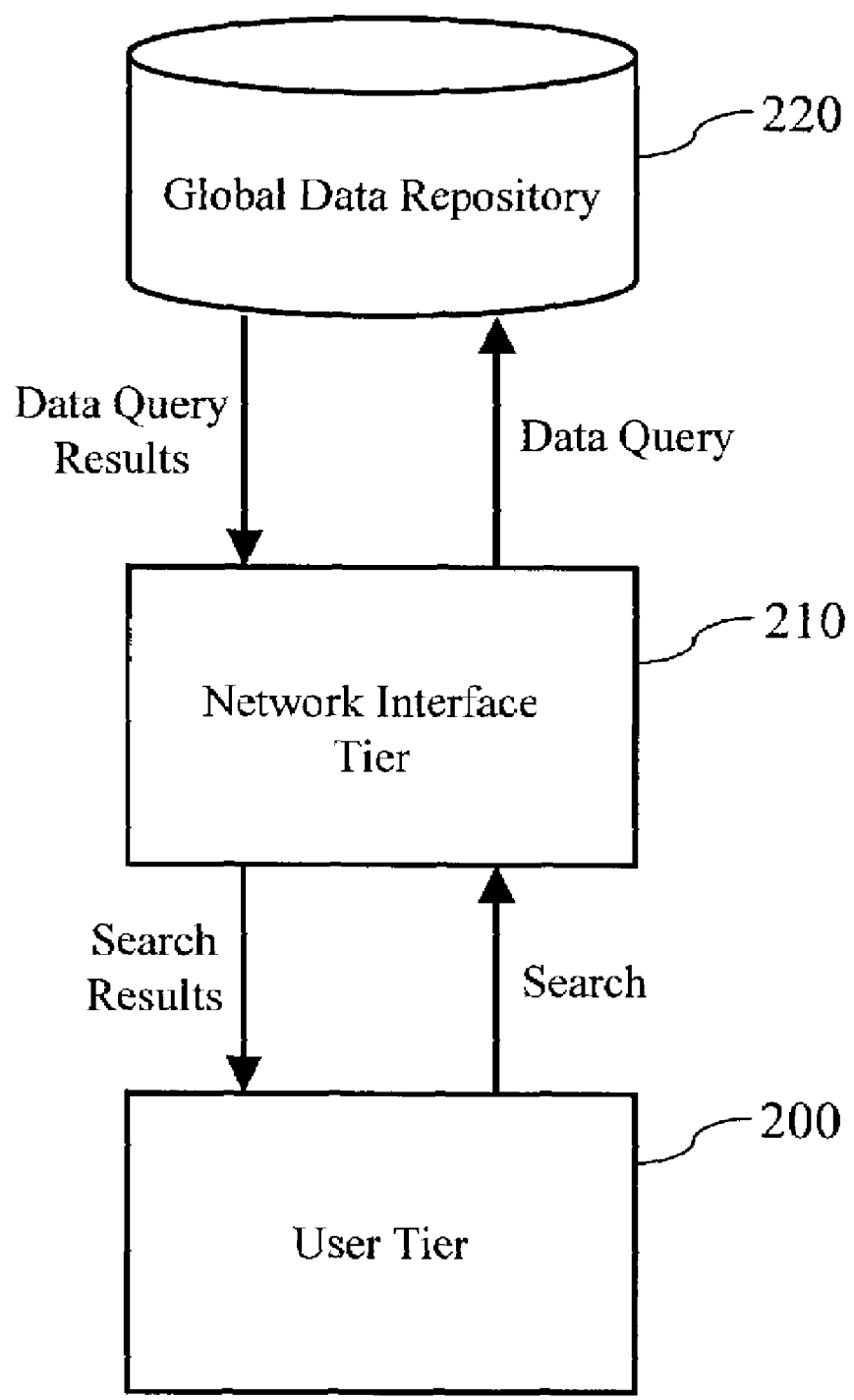
FIG. 6 is a schematic diagram showing the three-tiered architecture of one embodiment of a system for selecting a material that best matches a desired set of properties.

Embodiments of the present invention also comprise material selection systems. In one embodiment, the material selection system comprises a three-tier architecture as shown in FIG. 6. The three tiers in this embodiment include the user tier 200, the network tier 210 and the database tier 220. The user tier in this embodiment allows a user to input or select various input parameters. Some non-limiting examples of these various input parameters comprise: which properties the user wishes to have displayed, which properties they wish to be searched, what the acceptable property values are for each property being searched, a priority value for each property being searched, and/or the number of matching materials they wish to have displayed. This user tier may contain a material search interface layer implemented in any suitable manner, such as by JavaServer Pages™ (JSP) technology and/or JavaScript. In this embodiment, the network tier layer hosts the actual application that performs the material search (i.e., the network tier acts as the material search engine). The network tier accepts the user's inputs, and then performs the search/data query over the database layer. The search results may then be returned to the user via the user tier. This functionality may be achieved in any suitable manner, such as by using a web server, Java Servlet and/or Java Data Base Connectivity (JDBC™) technology.

Embodiments of this invention search a global data repository comprising any type of materials such as, for example, plastics, glasses, ceramics, and/or metals, etc. Other embodiments search a global data repository comprising commercial or developmental grade engineering thermoplastics. These thermoplastics may comprise, for example, polyesters, such as polyethylene terephthalate (PET), polybutylene terephthalate (PBT), polyethylene naphthalate (PEN), liquid crystal polyester (LCP) and the like, polyolefins, such as polyethylene (PE), polypropylene (PP), polybutylene or the like, styrene-type resins, etc. or polyoxymethylene (POM), polyamide (PA), polycarbonate (PC), polymethylene methacrylate (PMMA), polyvinyl chloride (PVC), polyphenylene sulfide (PPS), polyphenylene ether (PPE), polyimide (PI), polyamide imide (PAI), polyetherimide (PEI), polysulfone (PSU), polyether sulphone (PES), polyketone (PK), polyether ketone (PEK), polyether ether ketone (PEEK), polyalylate (PAR), polyethernitrile (PEN), phenol resins (novolac type or the like), phenoxy resins, fluorocarbon resins, or, furthermore, thermoplastic elastomers of a polystyrene type, a polyolefin type, a polyurethane type, a polyester type, a polyamide type, a polybutadiene type, polyisoprene type, a fluorine type or the like, or copolymers or modifications of any of the these substances, or blended resins of two or more of these substances or the like. More preferably, these thermoplastics comprise styrene-type resins, polycarbonate resins, polyphenylene ether resins, polyamide resins, polyester resins, polyphenylene sulfide resins, polyolebi resins, liquid-crystalline resins and phenoltype resins. The thermoplastics in this invention may further comprise one or more reinforcing agents such as glass, talc, mica, clay, or combinations thereof, flame retarding compounds used alone or in conjunction with a synergist; drip retarding agent(s); and/or a wide variety of other additives such as stabilizers, pigments, colorants, processing aids, antioxidants and the like.

As described above, the systems and methods of the present invention allow a user to quickly and easily identify a material that closely matches desired performance criteria. Advantageously, these systems and methods may significantly speed up new product development times, allowing new products to get to market quicker than in the past.

Various embodiments of the invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A method for selecting a material that most closely matches a desired set of properties, the method comprising:

obtaining at least one input parameter for display from a user;

means for the user selecting from the at least one input parameter for display at least one parameter for searching;

retrieving actual property values for at least one preliminary matching material from a global data repository;

determining how well each preliminary matching material matches a desired set of property values; and outputting the results to the user;

wherein the determining step comprises:

calculating an index value for each actual property value of each preliminary matching material;

scoring each property value to create a scored property value;

weighting each scored property value by taking a priority value for each property into account to create a weighted scored property value, wherein the weighted scored property value is calculated using the formula:

Weighted score property value=Scored property value*Priority value; and calculating an overall match score for each preliminary matching material using the formula:

$$\text{Overall Match Score} = \frac{\text{Sum of all weighted score property value}}{\text{Sum of all priority values}}.$$

2. The method of claim 1, further comprising:

sorting the preliminary matching materials by theft respective overall match scores prior to outputting the results to the user.

3. The method of claim 2, wherein the preliminary matching materials are sorted in descending order based on their respective overall match scores.

4. The method of claim 1, wherein the at least one input parameter comprises at least one of: units for each property, acceptable property values for each property to be searched, a priority value for each property to be searched, and a number of matching materials to display.

5. The method of claim 4, wherein the acceptable property values for each property to be searched comprises at least one of: a minimum acceptable property value, a maximum acceptable property value, a range of acceptable property values, and an acceptable point value for a property.

6. The method of claim 4, wherein the priority value for each property to be searched comprises at least one of: high, medium and low.

7. The method of claim 1, wherein at least one input parameter obtained from the user is a minimum acceptable property value or a maximum acceptable property value for a property, the index value is calculated using the formula:

$$\text{Index value} = \frac{\text{Actual property value}}{\text{Desired property value}}.$$

8. The method of claim 1, wherein at least one input parameter obtained from the user is a range of acceptable property values for a property, the index value is calculated using the formula:

$$\text{Index value}_{range} = \frac{\text{Actual property value} - (\text{LOW} + \text{HIGH})/2}{\text{HIGH} - \text{LOW}}$$

wherein LOW is the minimum value of the acceptable range and HIGH is the maximum value of the acceptable range.

9. The method of claim 1, wherein at least one input parameter obtained from the user is a minimum acceptable property value for a property, the scored property value is calculated using the fuzzy membership function:

$$\text{Scored property value} = \frac{1}{1 + \exp[-\text{Slope}(\text{Index value} - \text{Crossover})]}$$

wherein Slope=15 and Crossover=0.95.

10. The method of claim 1, wherein at least one input parameter obtained from the user is a maximum acceptable property value for a property, the scored property value is calculated using the fuzzy membership function:

$$\text{Scored property value} = \frac{1}{1 + \exp[-\text{Slope}(\text{Index value} - \text{Crossover})]}$$

wherein Slope=-15 and Crossover=1.05.

11. The method of claim 1, wherein at least one input parameter obtained from the user is an acceptable point value for a property, and the desired property value for that property equals zero (0), the scored property value is one (1).

12. The method of claim 1, wherein at least one input parameter obtained from the user is an acceptable point value for a property, and the desired property value for that property does not equal zero (0), the scored property value is zero (0).

13. The method of claim 1, wherein at least one input parameter obtained from the user is an acceptable point value for a property, and:

Actual property value<DPV*0.9 wherein DPV=desired property value, the scored property value is zero (0).

14. The method of claim 1, wherein at least one input parameter obtained from the user is an acceptable point value for a property, and:

DPV*0.9·ltoreq·Actual property value<DPV the scored property value is calculated using the fuzzy membership function:

$$\text{Scored Property Value} = \frac{(DPV*0.1) - DPV + APV}{(DPV*0.1)}$$

wherein DPV=desired property value and APV=actual property value.

15. The method of claim 1, wherein at least one input parameter obtained from the user is an acceptable point value for a property, and:

Actual property value=DPV wherein DPV=desired property value, the scored property value is one (1).

16. The method of claim 1, wherein at least one input parameter obtained from the user is an acceptable point value for a property, and:

DPV<Actual property value·ltoreq·DPV* 1.1 the scored property value is calculated using the fuzzy membership function:

$$\text{Scored Property Value} = \frac{(DPV * 0.1) + DPV - APV}{(DPV * 0.1)}$$

wherein DPV=desired property value and APV=actual property value.

17. The method of claim 1, wherein at least one input parameter obtained from the user is an acceptable point value for a property, and:

Actual property value>DPV*1.1 wherein DPV=desired property value, the scored property value is zero (0).

18. The method of claim 1, wherein at least one input parameter obtained from the user is a range of acceptable property values for a property, and the index value for that property is less than −1, the scored property value equals zero (0).

19. The method of claim 1, wherein at least one input parameter obtained from the user is a range of acceptable property values for a property, and:

−1·ltoreq·Index value<−0.5 the scored property value is calculated using the fuzzy membership function:

Scored property value=2(1.0+Index value).

20. The method of claim 1, wherein at least one input parameter obtained from the user is a range of acceptable property values for a property, and:

−0.5·ltoreq·Index value<0.5 the scored property value is one (1).

21. The method of claim 1, wherein at least one input parameter obtained from the user is a range of acceptable property values for a property, and:

0.5·ltoreq·Index value<1 the scored property is calculated using the fuzzy membership function:

Scored property value=2(1.0−Index value).

22. The method of claim 1, wherein at least one input parameter obtained from the user is a range of acceptable property values for a property, and the index value for that property is greater than one (1), the scored property value is zero (0).

23. The method of claim 1, wherein a high priority exists for a property, a priority value of 4 is assigned to that property, a medium priority exists for a property, a priority value of 2 is assigned to that property, and a low priority exists for a property, a priority value of 1 is assigned to that property.

24. The method of claim 1, wherein each preliminary matching material comprises an engineering thermoplastic.

25. The method of claim 24, wherein the engineering thermoplastic comprises at least one of a polyester, polyethylene terephthalate (PET), polybutylene terephthalate (PBT), polyethylene naphthalate (PEN), liquid crystal polyester (LCP), a polyolefin, polyethylene (PE), polypropylene (PP), polybutylene, a styrene-type resin, polyoxymethylene (POM), polyamide (PA), polycarbonate (PC), polymethylene methacrylate (PMMA), polyvinyl chloride (PVC), polyphenylene sulfide (PPS), polyphenylene ether (PPE), polyimide (PI), polyamide imide (PAI), polyetherimide (PEI), polysulfone (PSU), polyether sulphone (PES), polyketone (PK), polyether ketone (PEK) polyether ether ketone (PEEK), polyalylate (PAR), polyethernitrile (PEN), a phenol resin (novolac type), a phenoxy resin, a fluorocarbon resin, a thermoplastic elastomer of a polystyrene type, a thermoplastic elastomer of a polyolefin type, a thermoplastic elastomer of a polyurethane type, a thermoplastic elastomer of a polyester type, a thermoplastic elastomer of a polyamide type, a thermoplastic elastomer of a polybutadiene type, a thermoplastic elastomer of a polyisoprene type, and a thermoplastic elastomer of a fluorine type.

26. The method of claim 24, wherein the engineering thermoplastic comprises at least one of a styrene-type resin, a polycarbonate resin, a polyphenylene ether resin, a polyamide resin, a polyester resin, a polyphenylene sulfide resin, a polyolebi resin, a liquid-crystalline resin and a phenol-type resin.

27. A system for selecting a material that most closely matches a desired set of properties, the method comprising:
   a means for obtaining at least one input parameter for display from the user;
   a means for the user selecting from the at least one input parameter for display at least one parameter for searching;
   a means for retrieving actual property values for at least one preliminary matching material from a global data repository;
   a material selecting algorithm operable for determining a match between each preliminary matching material and a desired set of property values; and
   a means for outputting the results to the user;
   wherein the determining step comprises:
   calculating an index value for each actual property value of each preliminary matching material;
   scoring each property value to create a scored property value;
   weighting each scored property value by taking a priority value for each property into account to create a weighted scored property value, wherein the weighted scored property value is calculated using the formula:

Weighted score property value=Scored property value*Priority value; and

Calculating an overall match score for each preliminary matching material using the formula:

$$\text{Overall Match Score} = \frac{\text{Sum of all weighted score property value}}{\text{Sum of all priority values}}..$$

28. The system of claim 27, wherein the material selection algorithm is further operable for:
   sorting the preliminary matching materials by their respective overall match scores prior to outputting the results to the user.

29. The system of claim 28, wherein the preliminary matching materials are sorted in descending order based on their respective overall match scores.

30. The system of claim 27, wherein the at least one input parameter comprises at least one of: units for each property, acceptable property values for each property to be searched, a priority value for each property to be searched, and a number of matching materials to display.

31. The system of claim 30, wherein the acceptable property values for each property to be searched comprises at least one of: a minimum acceptable property value, a maximum acceptable property value, a range of acceptable property values, and an acceptable point value for a property.

32. The system of claim 30, wherein the priority value for each property to be searched comprises at least one of: high, medium and low.

33. The system of claim 27, wherein at least one input parameter obtained from the user is a minimum acceptable property value or a maximum acceptable property value for a property, the index value is calculated using the formula:

$$\text{Index value} = \frac{\text{Actual property value}}{\text{Desired property value}}$$

34. The system of claim 27, wherein at least one input parameter obtained from the user is a range of acceptable property values for a property, the index value is calculated using the formula:

$$\text{Index value range} = \frac{\text{Actual property value} - (\text{LOW} + \text{HIGH})/2}{\text{HIGH} - \text{LOW}}$$

wherein LOW is the minimum value of the acceptable range and HIGH is the maximum value of the acceptable range.

35. The system of claim 27, wherein at least one input parameter obtained from the user is a minimum acceptable property value for a property, the scored property value is calculated using the fuzzy membership function:

$$\text{Scored property value} = \frac{1}{1 + \exp[-\text{Slope}(\text{Index value} - \text{Crossover})]}$$

wherein Slope=15 and Crossover=0.95.

36. The system of claim 27, wherein at least one input parameter obtained from the user is a maximum acceptable property value for a property, the scored property value is calculated using the fuzzy membership function:

$$\text{Scored property value} = \frac{1}{1 + \exp[-\text{Slope}(\text{Index value} - \text{Crossover})]}$$

wherein Slope=−15 and Crossover=1.05.

37. The system of claim 27, wherein at least one input parameter obtained from the user is an acceptable point value for a property, and the desired property value for that property equals zero (0), the scored property value is one (1).

38. The system of claim 27, wherein at least one input parameter obtained from the user is an acceptable point value for a property, and the desired property value for that property does not equal zero (0), the scored property value is zero (0).

39. The system of claim 27, wherein at least one input parameter obtained from the user is an acceptable point value for a property, and:

Actual property value<DPV*0.9 wherein DPW=desired property value, the scored property value is zero (0).

40. The system of claim 27, wherein at least one input parameter obtained from the user is an acceptable point value for a property, and:

DPV*0.9·ltoreq.Actual property value<DPV the scored property value is calculated using the fuzzy membership function: 19 Scored Property Value= (DPV*0.1)−DPV+APV(DPV*0.1) wherein DPV=desired property value and APV=actual property value.

41. The system of claim 27, wherein at least one input parameter obtained from the user is an acceptable point value for a property, and:

Actual property value=DPV wherein DPV=desired property value, the scored property value is one (1).

42. The system of claim 27, wherein at least one input parameter obtained from the user is an acceptable point value for a property, and:

DPV<Actual property value·ltoreq.DPV*1.1 the scored property value is calculated using the fuzzy membership function:

$$\text{Scored Property Value} = \frac{(DPV*0.1) - DPV + APV}{(DPV*0.1)}$$

wherein DPV=desired property value and APV=actual property value.

43. The system of claim 27, wherein at least one input parameter obtained from the user is an acceptable point value for a property, and:

Actual property value>DPV*1.1 wherein DPV=desired property value, the scored property value is zero (0).

44. The system of claim 27, wherein at least one input parameter obtained from the user is a range of acceptable property values for a property, and the index value for that property is less than −1, the scored property value equals zero (0).

45. The system of claim 27, wherein at least one input parameter obtained from the user is a range of acceptable property values for a property, and:

−1·ltoreq·Index value<−0.5 the scored property value is calculated using the fuzzy membership function:

Scored property value=2(1.0+Index value).

46. The system of claim 27, wherein at least one input parameter obtained from the user is a range of acceptable property values for a property, and:

−0.5·ltoreq·Index value<0.5 the scored property value is one (1).

47. The system of claim 27, wherein at least one input parameter obtained from the user is a range of acceptable property values for a property, and:

0.5·ltoreq·Index value<1 the scored property is calculated using the fuzzy membership function:

Scored property value=2(1.0−Index value).

48. The system of claim 27, wherein at least one input parameter obtained from the user is a range of acceptable property values for a property, and the index value for that property is greater than one (1), the scored property value is zero (0).

49. The system of claim 27, wherein a high priority exists for a property, a priority value of 4 is assigned to that property, a medium priority exists for a property, a priority value of 2 is assigned to that property, and a low priority exists for a property, a priority value of 1 is assigned to that property.

50. The system of claim 27, wherein each preliminary matching material comprises an engineering thermoplastic.

51. The system of claim 50, wherein the engineering thermoplastic comprises at least one of a polyester, polyethylene terephthalate (PET), polybutylene terephthalate (PBT), polyethylene naphthalate (PEN), liquid crystal polyester (LCP), a polyolefin, polyethylene (PE), polypropylene (PP), polybutylene, a styrene-type resin, polyoxymethylene (POM), polyamide (PA), polycarbonate (PC), polymethylene methacrylate (PMMA), polyvinyl chloride (PVC), polyphenylene sulfide (PPS), polyphenylene ether (PPE), polyimide (PI), polyamide imide (PAI), polyetherimide (PEI), polysulfone (PSU), polyether sulphone (PES), polyketone (PK), polyether ketone (PEK), polyether ether ketone (PEEK), polyalylate (PAR), polyethernitrile (PEN), a phenol resin (novolac type), a phenoxy resin, a fluorocarbon resin, a thermoplastic elastomer of a polystyrene type, a thermoplastic elastomer of a polyolefin type, a thermoplastic elastomer of a polyurethane type, a thermoplastic elastomer of a polyester type, a thermoplastic elastomer of a polyamide type, a thermoplastic elastomer of a polybutadiene type, a thermoplastic elastomer of a polyisoprene type, and a thermoplastic elastomer of a fluorine type.

52. The system of claim 50, wherein the engineering thermoplastic comprises at least one of a styrene-type resin, a polycarbonate resin, a polyphenylene ether resin, a polyamide resin, a polyester resin, a polyphenylene sulfide resin, a polyolebi resin, a liquid-crystalline resin and a phenol-type resin.

* * * * *